United States Patent [19]
Shiina et al.

[11] 3,936,041
[45] Feb. 3, 1976

[54] AUTOMATIC ORIGINAL SUPPLY DEVICE FOR ELECTRONIC COPYING APPARATUS

[75] Inventors: Toshio Shiina, Yokohama; Masao Yaejima, Sendai; Tadayuki Sekiya; Toshiro Bando, both of Yokohama, all of Japan

[73] Assignee: Ricoh Co., Ltd., Tokyo, Japan

[22] Filed: Dec. 26, 1974

[21] Appl. No.: 536,295

[30] Foreign Application Priority Data
Dec. 26, 1973    Japan.............................. 48-143935

[52] U.S. Cl. .................... 271/4; 271/110; 271/116; 271/258; 271/265
[51] Int. Cl.². ......................................... B65H 7/14
[58] Field of Search ............... 271/4, 6, 7, 110, 111, 271/114, 116, 258, 265, 270

[56]    References Cited
        UNITED STATES PATENTS

| 3,575,108 | 4/1971 | Scranton................................. 271/4 |
| 3,697,063 | 10/1972 | Greenfield et al....................... 271/4 |
| 3,762,813 | 10/1973 | Fowne et al............................. 271/4 |
| 3,829,083 | 8/1974 | Shiina et al.............................. 271/4 |

Primary Examiner—Evon C. Blunk
Assistant Examiner—Robert Saifer
Attorney, Agent, or Firm—Cooper, Dunham, Clark, Griffin & Moran

[57]    ABSTRACT

An automatic original document supply device for electronic copying apparatus including a detection and control system, interposed between the original supply roller system and the original conveying and holding belt, which detects the passing of the trailing end of an original and produces a signal in response thereto for stopping the belt with the first original disposed in a predetermined illumination position and stopping the supply roller system with the next following original in a standby position. Over-running clutch arrangements are also provided in the supply roller system to permit the imposition of differential conveying speeds on the originals while passing the detection and control system, and to facilitate the reverse removal of an original from the supply roller system after positioning in the standby position.

2 Claims, 4 Drawing Figures

AUTOMATIC ORIGINAL SUPPLY DEVICE FOR ELECTRONIC COPYING APPARATUS

This invention relates to an automatic original supply device for electronic copying apparatus.

An automatic original supply device is known in connection with copying apparatus whereby one or a plurality of copies may be automatically produced from each of a large number of original documents of the same size and type, e.g. promissory notes or checks. The automatic original supply device of this type such as shown in U.S. Pat. No. 3,829,083 comprises (1) an original standby section including an original support tray and separation and supply means consisting of an original supply roller and a separation roller for supplying one original after another in sequence from a pile of originals on the original support tray; (2) an original conveying and holding section including a belt for conveying to a predetermined illumination position an original supplied by the original supply roller and the separation roller and holding the same in such position for illumination; and (3) an original ejection section including original delivery means for removing the original after the illumination step and an original receiving tray for receiving the original delivered by the delivery means. In the apparatus of this type, a pair of original feed rollers and original detection means are arranged between the separation and supply means and the conveying belt and cooperate with each other so that the next following original supplied by the separation and supply means will stand by till the preceding original disposed in the illumination position is processed through the illumination step.

This invention has for its object the provision of an automatic original supply device of the aforementioned type in which the construction is simplified and yet the same function can be performed.

The present invention dispenses with the original feed rollers of the prior art apparatus and provides an original detection system interposed between the separation and supply means and the conveying belt for detecting the passage of the trailing end of an original, which detection system provides appropriate signals for controlling the sequential operation of the copying apparatus. Timer means are provided which are actuated in response to the detection of the trailing end of an original for stopping the conveying belt after a predetermined lapse of time when the original reaches the predetermined illumination position.

The timer means generally have the following character. If the leading end of the next following original reaches the original detection means before the operation of the timer means comes to an end, the timer means will cease to perform their function, with a result that the timer means will continue to operate and the original supply roller will continue to rotate. Thus originals will be fed continuously without interruption. If this is the case, each original will not stop in the illumination position and exposing of a photosensitive sheet or sheets to an optical image of each original will be prevented. To obviate this drawback, it is essential that the leading end of the next following original be prevented from reaching the original detection means while the timer means are in operation or before the trailing end of the preceding original reaches the predetermined illumination position. In order to insure this, according to the invention, the spacing between the various means and the conveying velocities of the supply means and the conveying belt are arranged in a predetermined relationship.

The supply means is also provided with appropriate overrunning clutch means to accommodate for the differential conveying velocities and to permit reverse removal of an original from the supply means after it has reached the standby position.

Other and additional objects and features of the invention will become evident from the description of an embodiment set forth hereinafter when considered in conjunction with the accompanying drawings, in which.

Figure 1:
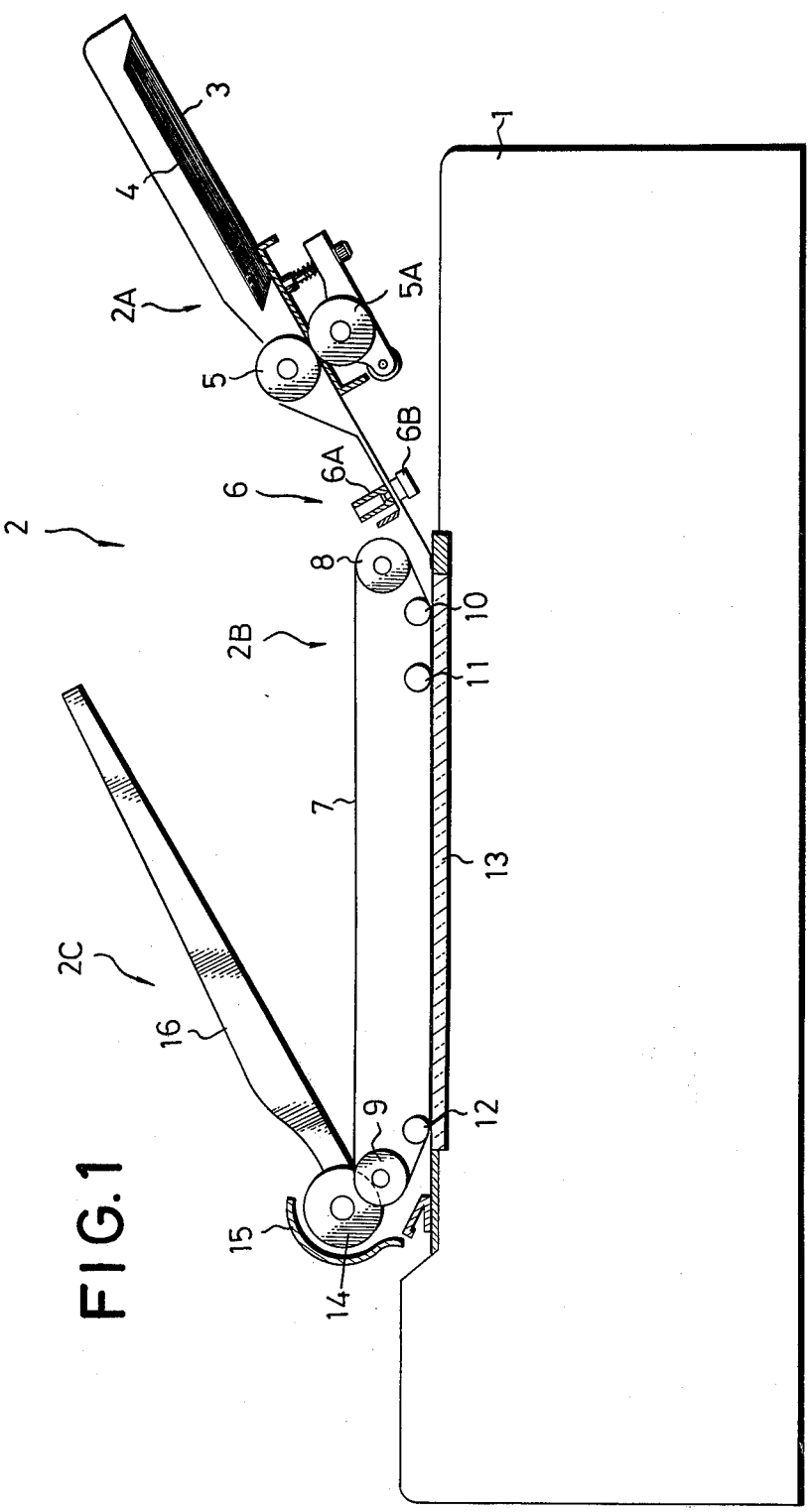
FIG. 1 is a schematic view of an automatic original supply device comprising one embodiment of the present invention attached to an electronic copying apparatus.

A preferred embodiment of the invention will now be described. Referring to FIG. 1, an electronic copying apparatus 1 is provided with an automatic original supply device 2 which comprises an original standby section 2A, an original conveying and holding section 2B, and an original section 2C. The original standby section 2A has mounted therein an original support tray 3 which is inclined so as to support thereon a pile of original documents 4 arranged in vertically stacked relation, with the leading edges of the upper originals being forwardly displaced as shown. The section 2A also has mounted therein an original supply roller 5 and a separation roller 5A against which the leading end of the uppermost original abuts when the pile of documents is moved downward into position for feeding. Rollers 5 and 5A supply the uppermost original of the pile of originals 4 one by one to the next operation step upon the actuation of an appropriate print control means. The first original thus supplied from the tray 3 moves through original detection means 6 comprising a lamp 6A serving as a light source and a light receiving detector 6B, and is held between a belt 7 trained over a drive roller 8 and guide rollers 9, 10, 11 and 12 and an original supporting glass sheet 13 of the copying apparatus. Upon the original thus moving between the belt 7 and the glass sheet 13 reaching an illumination position, the belt 7 is temporarily stopped to hold the original in such position. An optical system within the apparatus causes it to be illuminated so as to expose a photosensitive sheet or sheets to an optical image of the original. After illumination of the original the desired number of times, the belt 7 begins to move again, in response to appropriate control means, so as to move the original through a discharge roller 14 and a guide plate 15 and eject the same onto a original receiving tray 16.

Figure 2:
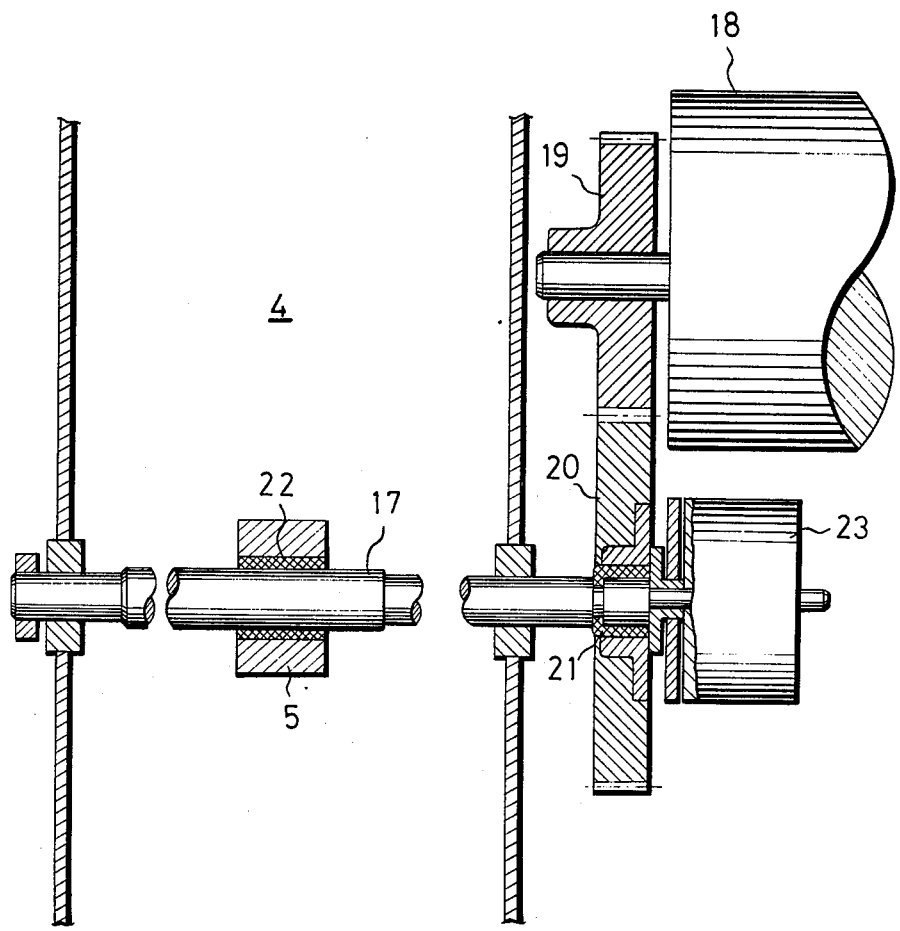
FIG. 2 is a view illustrating the drive system for the original supply roller.

Referring to FIG. 2, the original supply roller 5 is supported by a shaft 17 which is driven to rotate by a drive motor 18 through a transmission system comprising a gear 19, mounted on a shaft of the motor 18, a gear 20 in meshing engagement with gear 19, and a clutch 23. An overrunning clutch 21 is mounted between the output side of the clutch 23 and the shaft 17 while another overrunning clutch 22 is mounted between the shaft 17 and the original supply roller 5. Overrunning clutch 21 remains inoperative when the clutch 23 is driving the shaft 17, that is, when the shaft 17 rotates together with the clutch 23. However, when the shaft 17 is rotated in a direction opposite to the direction of rotation of the clutch 23, overrunning clutch 21 becomes operative to permit such opposite rotation free of the action of clutch 23. Thus, when it is desired to return an original held between the original supply roller 5 and separation roller 5A to its initial position because of jamming or for some other reason, the end can be attained by pulling back the original by hand, whereupon the original supply roller 5 and its shaft 17 will both rotate in the reverse direction by virtue of the action of overrunning clutch 21. In this way, the original can be readily restored to its initial position.

Overrunning clutch 22 operates such that it remains inoperative when the shaft 17 is driving the original supply roller 5, that is, when roller 5 rotates together with the shaft 17, but when the roller 5 rotates at a higher rate than the shaft 17 overrunning clutch 22 is operative to allow the roller 5 to rotate at the higher rate free of the shaft 17.

Figure 3:
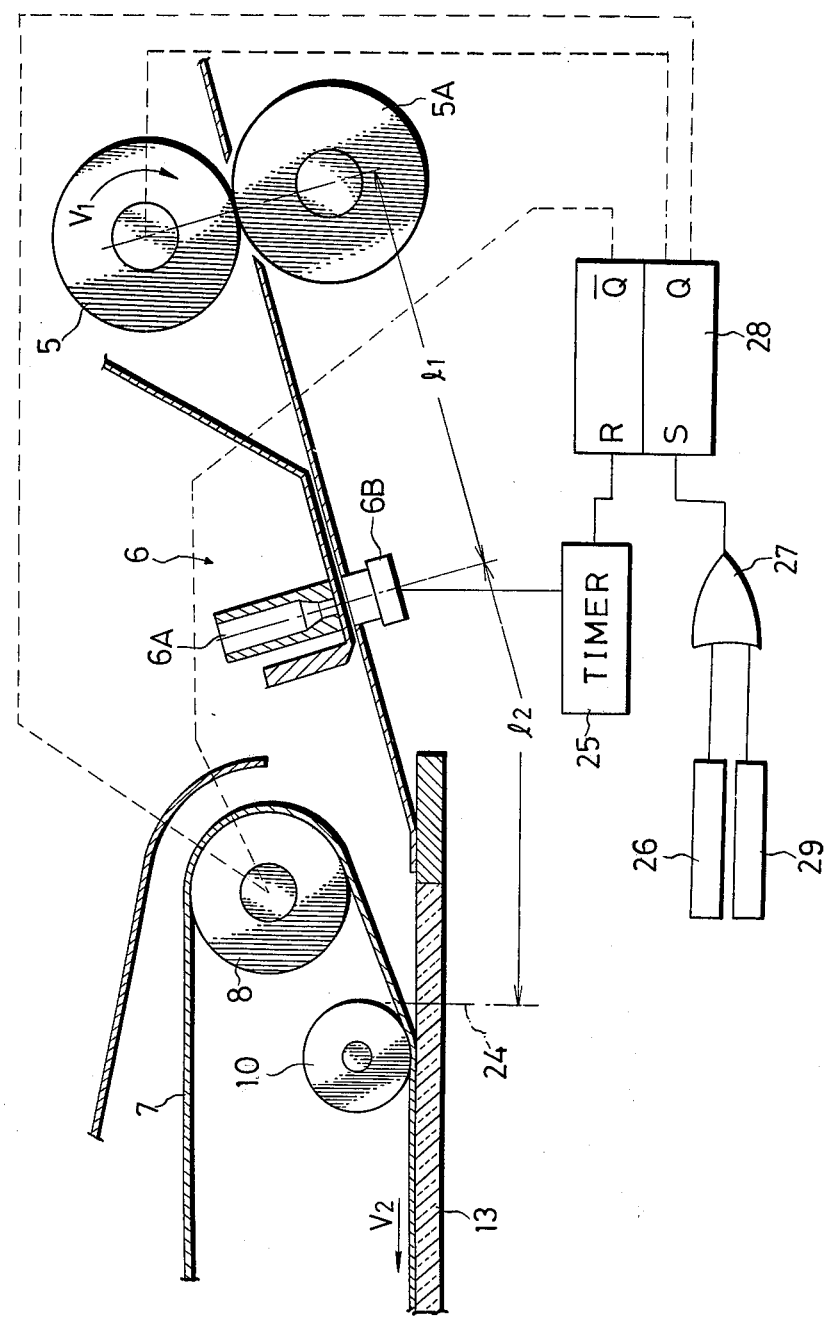
FIG. 3 is a schematic view, on an enlarged scale, of the essential portions of the device according to the invention.

Referring to FIG. 3, it will be seen that in operation the belt 7 of the original conveying and holding section 2B has a velocity $V_2$ which is about twice as high as that of the peripheral velocity $V_1$ of the feed roller 5. Thus, if a first original document 4 supplied by the original supply roller 5, in response to a print signal, has its leading end gripped by the belt 7, the original 4 will move thereafter at the same velocity $V_2$ at which the belt 7 moves. This will cause the roller 5 to rotate at a rate higher than the rate of rotation of the shaft 17 due to frictional dragging of the original 4 on the roller 5 which is permitted by virtue of the action of overrunning clutch 22.

Figure 4:
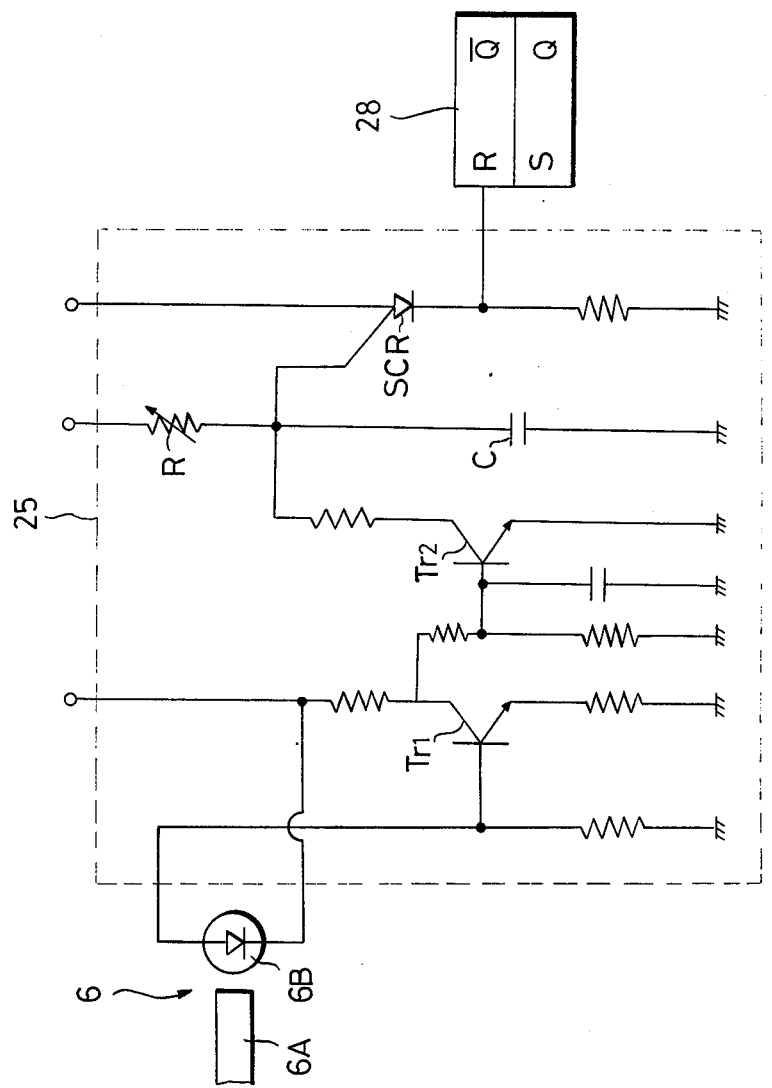
FIG. 4 shows timer means having a usual circuit and used in this invention.

Upon the trailing end of the original 4 being detected by the original detection means 6, the belt 7 will be stopped after the lapse of a predetermined time interval by the operation of timer means 25 having a usual structure and function, as is shown in FIG. 4. When the movement of the original 4 is interrupted, it will be disposed in the illumination position on the glass sheet 13, with its trailing end being disposed in the position indicated at 24 in FIG. 3.

Also, as soon as the trailing end of the first original 4 moves through the separation and supply means 5, 5A, the leading end of the next original in the pile slides forward and feeding of a second original is initiated. Since the second original is supplied at the lower velocity $V_1$ of the original supply roller 5, and the first original is moved at the higher velocity $V_2$ of the belt 7, the two originals are spaced apart a relatively long distance. Thus, when the movement of the first original is interrupted upon reaching the illumination position, the leading end of the second original does not reach the original detection means 6 yet.

Upon depression of a printing button, clutch means of the supply roller 5 and the drive roller 8 are made operative by signals coming through a printing switch 26, an OR-circuit 27 and a flip-flop circuit 28, a brake means in the drive roller 8 being simultaneously disconnected by another signal from the flip-flop circuit 28. Thus the supply roller 5 will be actuated and will feed the first original standing by, at a velocity $V_1$, past the detection means 6 to the belt 7, which has begun operation simultaneously with the supply roller 5. The leading end of the original will be gripped by the belt 7 causing the original to then be advanced at a velocity $V_2$. The trailing end of the original, which is still gripped by roller 5, is permitted to advance at the increased velocity $V_2$ by the action of overrunning clutch means 21. When the original detection means 6 detects the passing of the trailing end of the first original, it produces a signal which actuates timer means 25. The timer means 25 having transistors $Tr_1$ and $Tr_2$, RC circuit, SCR and the like, as is shown in FIG. 4, are set such that they will give a signal to the flip-flop circuit 28 after a predetermined time interval to make inoperative the clutch means of supply roller 5 and drive roller 8 and to make operative the brake means in the drive roller 8, whereby the operation of the belt 7 is interrupted when the trailing end of the first original reaches the position at 24 and the rotation of the roller 5 also is interrupted to stop the next following original in the standby position. Exposing of the first original takes place a number of times corresponding to the number of copies to be produced, in accordance with repeat means setting the number of desired copies. When the desired number of copies have been produced from the first original, an exposure end signal is produced in a circuit 29 to actuate the OR-circuit 27 as in the case of the printing switch signal. The clutch means of rollers 5 and 8 are again made operative and the brake means in the drive roller 8 are inoperative, the supply roller 5 and the belt 7 being again actuated. The second original disposed in the standby position will be moved in the manner of the first original to the illumination position. Successive operation of the apparatus in the manner described may continue until all of the originals on the rest tray are exhausted, whereupon the system may be automatically shut off.

In order to insure that the leading end of the next following original be prevented from reaching the original detection means 6, before the trailing end of the preceding original reaches the position 24, the following features may be incorporated in the device. As seen in FIG. 3, values for the distance $l_1$, between the separation and supply means 5, 5A and the original detection means 6, and the distance $l_2$, between the original detection means 6 and the position 24 in which the trailing end of the original is adapted to be disposed, as well as the velocity $V_1$ of the original supply roller 5 and the velocity $V_2$ of the belt 7 are selected such that the following relation holds:

$$\frac{l_1}{V_1} > \frac{l_1 + l_2}{V_2}$$

The left term of the inequality represents the time interval in which the leading end of the next following original supplied by the roller 5 covers the distance $l$, while the right term represents the time interval in which the trailing end of the preceding original covers the distance $l_1 + l_2$ at the rate of movement of the belt 7. This ensures that the leading end of the next following original reaches the original detection means 6 after the trailing end of the preceding original reaches the position 24.

From the foregoing description, it will be seen that the present invention dispenses with a pair of original feed rollers which have hitherto been provided between the separation and supply means and the belt in the prior art. This makes it possible to do without a drive mechanism for the pair of original feed rollers as well, thereby simplifying the construction. The absence of the pair of original feed rollers means that the possibility of damage to the orignals and their jamming can be reduced. Moreover, the rate of movement of the originals conveyed by the belt can be increased, so that the rate at which copying is effected can be increased.

Any adaptations of the main control system of the copying apparatus which are necessary to accommodate the present invention will be within the purview of those skilled in the art.

We claim:

1. An automatic original supply device for electronic copying apparatus of the type comprising:
   an original standby section including an original support tray and separation and supply means with a driven supply roller for supplying one original document after another from a pile of originals on said original support tray;
   an original conveying and holding section including a belt for conveying to a predetermined illumination position an original supplied by the original separation and supply means and holding the same in said position; and
   an original ejection section including original delivery means for removing the original processed through the illumination step;
   wherein the improvement comprises:
   original detection means interposed between the separation and supply means and said belt for detecting the passage of the trailing end of a first original;
   timer means actuated in response to the detection of the trailing end of said first original for stopping said belt after a predetermined lapse of time such that said first original is in said predetermined illumination position and for interrupting the operation of said original separation and supply means to cause said next original to stand by;
   overrunning clutch means for permitting said supply roller to rotate at a velocity higher than its driven velocity; and
   wherein the following relations hold:

$$\frac{l_1}{V_1} > \frac{l_1 + l_2}{V_2}$$

where $V_1$ is the velocity at which each original is supplied by said supply roller, $V_2$ is the velocity at which each original is conveyed by said belt, $l_1$ is the distance between said supply roller and the original detection means, and $l_2$ is the distance between the original detection means and the trailing end of an original disposed in the predetermined illumination position.

2. A device as in claim 1 further comprising release clutch means for permitting said supply roller to rotate in the opposite direction from which it is driven.

* * * * *